United States Patent
Aufderheide et al.

(10) Patent No.: US 7,967,053 B2
(45) Date of Patent: Jun. 28, 2011

(54) PROCESS FOR CASTING A PART FROM A POUR OF MOLTEN METAL INTO A MOLD ASSEMBLY

(75) Inventors: Ronald C. Aufderheide, Dublin, OH (US); Ralph E. Showman, Galloway, OH (US)

(73) Assignee: ASK Chemicals L.P., Wilmington, DE (US)

( * ) Notice: Subject to any disclaimer, the term of this patent is extended or adjusted under 35 U.S.C. 154(b) by 89 days.

(21) Appl. No.: 12/568,773

(22) Filed: Sep. 29, 2009

(65) Prior Publication Data

US 2010/0071866 A1    Mar. 25, 2010

Related U.S. Application Data

(62) Division of application No. 11/599,574, filed on Nov. 14, 2006, now abandoned.

(51) Int. Cl.
*B22D 29/00*    (2006.01)
*B22D 27/00*    (2006.01)
*B22D 23/00*    (2006.01)

(52) U.S. Cl. ......... 164/134; 164/131; 164/358; 164/527

(58) Field of Classification Search .................. 210/435, 210/510.1, 503, 504, 506; 55/523, 524; 164/134, 164/358, 527, 131
See application file for complete search history.

(56) References Cited

U.S. PATENT DOCUMENTS

| | | | |
|---|---|---|---|
| 3,409,579 A | 11/1968 | Robins | 523/143 |
| 3,981,352 A | 9/1976 | Nurminen et al. | 164/358 |
| 4,526,219 A | 7/1985 | Dunnavant et al. | 164/16 |
| 4,528,099 A | 7/1985 | Rieger et al. | 210/489 |
| 4,576,219 A * | 3/1986 | Uram | 164/358 |
| 4,690,763 A | 9/1987 | Rieger et al. | 210/496 |
| 4,713,180 A | 12/1987 | Hofmann et al. | 75/407 |
| 4,921,616 A | 5/1990 | Minjolle | 210/767 |
| 4,937,210 A | 6/1990 | Jones et al. | 501/80 |
| 5,104,540 A | 4/1992 | Day et al. | 210/510.1 |
| 5,190,897 A | 3/1993 | Azumi | 501/81 |
| 5,915,450 A | 6/1999 | Aufderheide et al. | 164/53 |
| 5,961,918 A | 10/1999 | Day | 266/227 |
| 5,983,984 A | 11/1999 | Auderheide et al. | 164/527 |
| 6,286,585 B1 | 9/2001 | Twardowska et al. | 164/527 |
| 6,296,794 B1 | 10/2001 | Day et al. | 264/109 |
| 6,335,387 B1 | 1/2002 | Twardowska et al. | 523/219 |
| 6,468,325 B1 | 10/2002 | Cutler et al. | 55/523 |
| 7,011,803 B2 | 3/2006 | Ichikawa et al. | 423/345 |

* cited by examiner

*Primary Examiner* — John Kim
(74) *Attorney, Agent, or Firm* — Stanley Law Group LLP

(57) ABSTRACT

This invention relates to filters made from a refractory material, preferably an insulating material, and chemical binder. The filters are used in the foundry industry to filter molten metal. The invention also relates to a process for preparing the filters.

5 Claims, 4 Drawing Sheets

PROCESS FOR CASTING A PART FROM A POUR OF MOLTEN METAL INTO A MOLD ASSEMBLY

CLAIM TO PRIORITY AND CROSS-REFERENCE TO RELATED APPLICATIONS

This application is a divisional application of U.S. patent application Ser. No. 11/599,574 filed Nov. 14, 2006, now abandoned which claims the benefit of U.S. application Ser. No. 10/975,875 filed on Oct. 28, 2004, the contents of which are hereby incorporated into this application.

TECHNICAL FIELD OF THE INVENTION

This invention relates to filters made from a refractory material, preferably an insulating material, and chemical binder. The filters are used in the foundry industry to filter molten metal. The invention also relates to a process for preparing the filters.

BACKGROUND OF THE INVENTION

Metal castings are made by pouring molten metal through a gating system into a casting assembly made of molds and cores. The molds and cores are typically made by shaping a mixture of a foundry aggregate, e.g. sand, and a foundry binder. When the molten metal is cooled, the metal casting is separated from the molds and cores and any excess aggregate and binder are removed from the casting.

Molten metal used to produce metal castings typically contains contaminants, e.g. metal oxides. Filters are used extensively in the foundry industry to filter contaminants found in molten metal. Typically the filter is made from ceramic materials that are formed by extrusion, pressing, or by impregnating a ceramic slurry into a foam. The shape is dried in an oven and fired in a kiln oven to cure the filter.

Patents describing various filters used in the foundry industry include U.S. Pat. No. 6,468,325 (making and firing in a kiln to for a filter), U.S. Pat. No. 6,296,794 (pressed porous filter bodies), U.S. Pat. No. 5,961,918 (honeycomb extruded filter), U.S. Pat. No. 5,190,897 (ceramic foam filter), U.S. Pat. No. 5,104,540 (filter with a carbon coating to minimize thermal shock to the filter), and U.S. Pat. No. 4,921,616 (alveolar ceramic filters for high melting metals).

Most of the filters described in these patents describe design changes to improve the filtering of tramp particles out of the liquid metal. The focus of the design is on the ability of the filter to trap small particles in the metal that could become a defect in the casting. Manufacturing costs, removal from the gating system, metal contamination by the filter itself, and design flexibility are not significantly addressed.

Furthermore, filters typically used in the foundry industry are hard to prime because of their mass and the relatively short time required to pour a casting. This is because filters require a large amount of heat to bring them up to the temperature of the metal. The heat needed to prime the filter comes from the molten metal, which in turn also cools the metal at a rapid rate.

There is also a problem with pieces of the filter getting back into the furnace when the metal from the gating system is re-melted. The filters become impregnated with metal and remain in the gating. When the gating system is returned to the furnace for re-melting small pieces of the filter can get trapped in the furnace and stay in the metal when it is poured potentially causing casting defects. Therefore, it is customary to remove the pieces of the filter from the molten metal in the furnace.

All citations referred to in this application are expressly incorporated by reference.

BRIEF SUMMARY OF THE INVENTION

Figure 1:
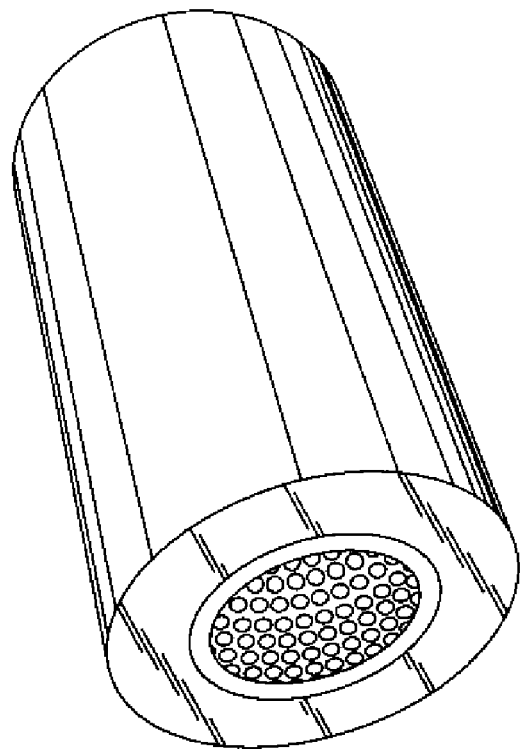
FIG. 1. A drawing of a convex shaped filter used in a pouring cup.

This invention relates to the manufacture, design and use of filters made from a refractory material, preferably an insulating material comprising ceramic microspheres, and a chemical binder. The filters are used in the foundry industry to filter molten metal during the casting of metal parts. The invention also relates to a process for making the filters, the unique designs that can be developed, and the use of the filters to make metal castings.

The filters utilize an insulating refractory that reduces the rate at which it heat is absorbed. The low density of the filters means they do not require as much heat to bring them to the temperature of the metal. Together, the insulation properties and low absorption rate of heat from the metal results in a filter that is easier to prime.

The filters can also contain minor amounts of exothermic materials that will provide some of the heat required to heat up the filter and further reduce the amount of heat absorbed from the metal. This will further improve the priming of the filter.

The filters address most of the issues that are currently not being addressed in the current filter designs, e.g. reducing manufacturing costs, ease of removal from the gating system, reduced metal contamination, and improved design flexibility.

Traditional filters are formed into a flat shape so the filters can be dried and fired in a high temperature furnace. The shapes need to be of a design that can be easily handled and loaded into a furnace without breaking or distorting. Therefore, the traditional shapes include flat surfaces (so they can be fully supported on boards or trays while the filters are being dried and fired) on the top and bottom of the filter. Only the sides have different shapes.

The process used to prepare the filters described herein allows for much more design flexibility since the filter is cured against the tooling and can be handled immediately upon removal from the tooling. The filter can even be machined if desired to create undercuts and back-drafts to provide more efficient filtration of the molten metal.

The process for making the filters has the following advantages:

1. No heat is required to cure the filter.
2. The refractory used to make the filter can be bonded with a wide variety of conventional foundry binders.
3. When cold box, hot-box, shell resins, and no-bake binders are used, the filter is cured against the tool. This allows for more design flexibility compared to the current filters that need to be placed on a plate and then fired in a kiln at extremely high temperatures.
4. There are potentially lower capital costs required to enter into the business and the manufacturing costs of the filters is potentially lower.
5. The filter can be incorporated as an integral part of a pouring cup, thus eliminating the need for assembly.
6. After the filter is exposed to the molten metal that is poured through it, the strength of the filter is very low and can be blasted off of the gating system, thus minimizing the amount of filter material that would get back into the furnace. This is a concern and a nuisance with the current ceramic fired filters.
7. Special prototype designs can be machined and/or cut from blanks of bonded and cured microspheres thus allowing for more design flexibility, including convex and concave surfaces, slots versus holes, and angled holes to name a few.
8. Special additives can be added to the filter formulation that can provide various benefits to the metal, such as but not limited to, iron oxide to reduce the carbon decomposition of the binder, and exothermic materials to provide heat to the filter, etc. When making traditional ceramic filters, the firing process in the kiln ovens would burn off or neutralize the effects on most additives.

DETAILED DESCRIPTION OF THE INVENTION

The detailed description and examples will illustrate specific embodiments of the invention and will enable one skilled in the art to practice the invention, including the best mode. It is contemplated that many equivalent embodiments of the invention will be operable besides these specifically disclosed.

For purposes of defining this invention, a "filter" is defined as a foundry shape having openings, e.g. holes, pores, channels, etc. through which molten metal flows, and which contains a surface that traps and removes contaminants in from the molten metal, e.g. metal oxides, etc. Openings in the filter can be obtained, for example, by drilling holes, cutting slotted vents in the bottom of a pouring cup, using pins in a pattern to make holes in the filter, and any other effective means.

The filter can be used in the mold, by itself to clean the molten metal, as part of a pouring cup and filter assembly, integrated into the pouring cup, integrated into the mold itself, or any other design that uses the teachings of this invention to filter molten metal when making a casting.

The filter may have traditional flat surfaces, a concave surface on the exit side of the filter which causes the metal to spread out into individual streams, which is bad for oxidizing the surface of the metal, but preferably has a convex surface on the exit side of the filter, which brings the individual streams back together helping to minimize the surface available for oxidation.

The refractory material used to make the filter comprises an insulating material. The insulating material will primarily depend upon the mold material. Examples of insulating materials include sand, pearlite, alumina, hollow glass spheres, etc. Blends of these materials may also be used. Preferably used as the insulating material are microspheres, most preferably ceramic microspheres. Examples of ceramic microspheres include hollow aluminosilicate microspheres, including aluminosilicate Extendospheres SG grades available from Potters Beads a division of the PQ Corporation and Envirospheres SLG available from Envirospheres Pty Ltd. The grade of refractory chosen will depend upon the performance requirements placed on the filter as well as the temperature of the metal itself.

The thermal conductivity of the hollow aluminosilicate microspheres ranges from about 0.15 W/m·K to about 0.25 W/m·K at room temperature. The hollow aluminosilicate microspheres typically have a particle size distribution of about 10 microns to about 350 microns. Preferred are hollow aluminosilicate microspheres having an average diameter of about 120 microns to 130 microns and a wall thickness of approximately 10% of the particle size. It is believed that hollow microspheres made of material other than aluminosilicate, having insulating properties, can also be used to replace or used in combination with the hollow aluminosilicate microspheres.

The weight percent of alumina to silica (as $SiO_2$) in the hollow aluminosilicate microspheres can vary over wide ranges depending on the application, for instance from 25:75 to 75:25, typically 33:67 to 50:50, where said weight percent is based upon the total weight of the hollow microspheres. Hollow aluminosilicate microspheres having a higher alumina content are better for making filters used in pouring metals such as iron and steel which have casting temperatures of 1300° C. to 1700° C. because hollow aluminosilicate microspheres having more alumina have higher melting points. Thus filters made with these hollow aluminosilicate microspheres will not degrade as easily at higher temperatures.

Other refractories, because of their higher densities and high thermal conductivities, may be used in the filter composition to impart higher melting points to the filter so the filter will not degrade when it comes into contact with larger volumes of the molten metal during the casting process. Examples of such refractories include silica, magnesia, alumina, olivine, chromite, aluminosilicate, and silicon carbide among others. These refractories are preferably used in amounts less than 94 weight percent based upon the weight of the filter composition, more preferably less than 50 weight percent based upon the weight of the total refractory used to make the filter.

The filters made with hollow aluminosilicate microspheres have low densities, low thermal conductivities, and excellent insulating properties. The density of the filter composition typically ranges from about 0.35 g/cc to about 0.45 g/cc, preferably about 0.4 g/cc.

In addition, the filter composition may contain exothermic materials (e.g. aluminum, iron oxide, manganese oxide, nitrate, potassium permanganate, etc), fillers, and additives.

The amount of insulating material in the refractory material can vary over wide ranges, but it typically ranges from 6 to 100 weight percent, preferably 50 to 100 weight percent where the weight percent is based upon the total weight of the refractory material.

The binders that can be used to prepare the filter includes any inorganic (e.g. sodium silicate binders cured with carbon dioxide) or organic binder used in the foundry industry to bind an aggregate into a foundry shape, e.g. a mold or core. For example, any no-bake, cold-box, shell sand resin or hot-box binder, which will sufficiently hold the mixture together in the shape of a filter and polymerize in the presence of a curing catalyst, will work. Examples of such binders include phenolic resins, phenolic urethane binders, furan binders, alkaline phenolic resole binders, and epoxy-acrylic binders among others. Particularly preferred are epoxy-acrylic and phenolic urethane binders known as ISOSET® ISOCURE and EXACTCAST® cold-box binders sold by Ashland Chemical Company. The phenolic urethane binders are described in U.S. Pat. Nos. 3,485,497 and 3,409,579, which are hereby incorporated into this disclosure by reference. These binders are based on a two part system, one part being a phenolic resin component and the other part being a polyisocyanate component. Phenolic urethane binders can be cured with both liquid no-bake catalysts or vaporized liquids such as triethylamine in the cold-box process. The epoxy-acrylic binders cured with sulfur dioxide in the presence of an oxidizing agent are described in U.S. Pat. No. 4,526,219, which is hereby incorporated into this disclosure by reference.

The mixture of the ceramic microspheres and binder (filter mix) can be shaped by using a pattern and then cured with a curing catalyst. Curing the filter by the no-bake process takes place by mixing a liquid curing catalyst with the filter mix, shaping the filter mix containing the catalyst, and allowing the filter shape to cure, typically at ambient temperature without the addition of heat. The preferred liquid curing catalyst is a tertiary amine and the preferred no-bake curing process is described in U.S. Pat. No. 3,485,797 which is hereby incorporated by reference into this disclosure. Specific examples of such liquid curing catalysts include 4-alkyl pyridines wherein the alkyl group has from one to four carbon atoms, isoquinoline, arylpyridines such as phenyl pyridine, pyridine, acridine, 2-methoxypyridine, pyridazine, 3-chloro pyridine, quinoline, N-methyl imidazole, N-ethyl imidazole, 4,4'-dipyridine, 4-phenylpropylpyridine, 1-methylbenzimidazole, and 1,4-thiazine.

Curing the filter mix by the cold-box process takes place by blowing or ramming the filter mix into a pattern and contacting the filter with a vaporous or gaseous catalyst. Various vapor or vapor/gas mixtures or gases such as tertiary amines, carbon dioxide, methyl formate, and sulfur dioxide can be used depending on the chemical binder chosen. Those skilled in the art will know which gaseous curing agent is appropriate for the binder used. For example, an amine vapor/gas mixture is used with phenolic-urethane resins. Sulfur dioxide (in conjunction with an oxidizing agent) is used with an epoxy-acrylic resins. See U.S. Pat. No. 4,526,219 which is hereby incorporated into this disclosure by reference. Carbon dioxide (see U.S. Pat. No. 4,985,489 which is hereby incorporated into this disclosure by reference) or methyl esters (see U.S. Pat. No. 4,750,716 which is hereby incorporated into this disclosure by reference) are used with alkaline phenolic resole resins. Carbon dioxide is also used with binders based on silicates. See U.S. Pat. No. 4,391,642 which is hereby incorporated into this disclosure by reference.

Preferably the binder is an EXACTCAST® cold-box phenolic urethane binder cured by passing a tertiary amine gas, such a triethylamine, through the molded filter mix in the manner as described in U.S. Pat. No. 3,409,579, or the epoxy-acrylic binder cured with sulfur dioxide in the presence of an oxidizing agent as described in U.S. Pat. No. 4,526,219. Typical gassing times are from 0.5 to 3.0 seconds, preferably from 0.5 to 1.0 seconds. Purge times are from 1.0 to 30 seconds, preferably from 1.0 to 10 seconds.

The amount of binder needed is an effective amount to hold the filter together in the desired shape. The amount can vary over wide ranges, but it typically from 3.0 to 12.0 weight percent, preferably 6.0 to 10.0 weight percent, where the weight percent is based upon the total weight of the refractory material.

In addition to making the filters with a pattern, the filter could be made by other methods typically employed in the foundry industry to make filters, e.g. extrusion, or pressed. Alternatively, the filter could be molded onto the bottom of a pouring cup or integrally in the gating system within the mold itself, such that it would be an integral part of the pouring cup and/or gating system within the mold assembly. This design eliminates the need to assemble two parts (the pouring cup and the filter) and would lower the cost of manufacturing.

Although the filters can be used to filter any molten metal, they are particularly useful for filtering molten aluminum, because aluminum is poured at a lower temperature and, as such, is less likely to burn up the binder used to make the filter before the mold is completely poured.

Ferrous metals with higher pouring temperatures will require a stronger binder that contains a higher degree of hot strength, possibly an inorganic binder, to hold the refractory together. Additionally, because of the lower melting point of the ceramic microspheres, blends of microspheres and various metal oxide ceramics may be needed for pouring larger volumes of metal at higher pouring temperatures. These metal oxides could include silica oxides, aluminum oxides, etc.

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated.

Examples 1-2

Filters Integrally Formed in Pouring Cup

Figure 3:
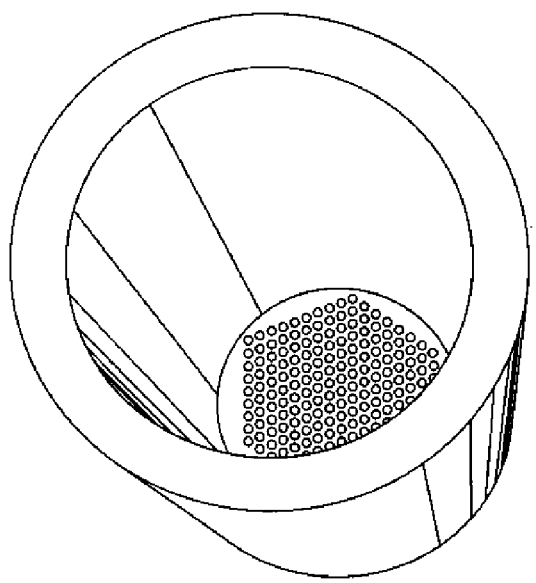
FIG. 3. A drawing of a traditional ceramic cellular filter in a pouring cup.
Figure 4:
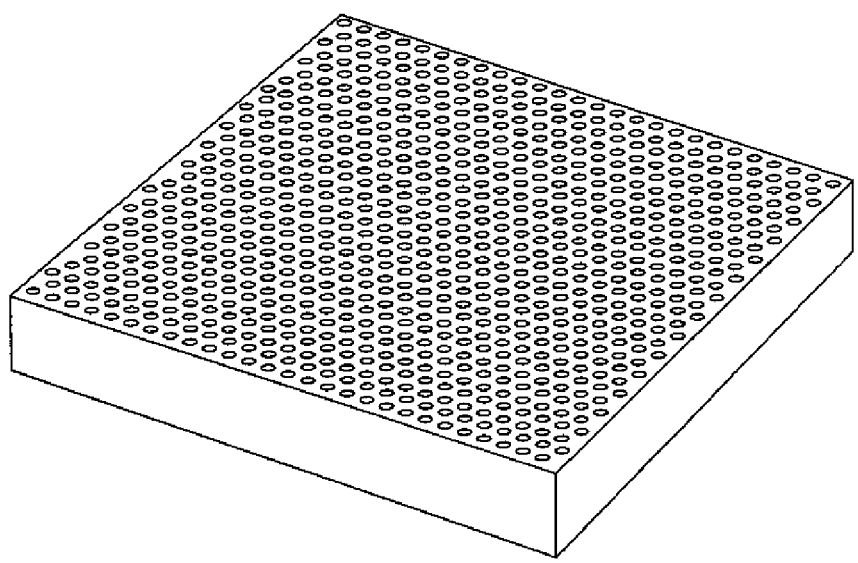
FIG. 4. A drawing of a pressed traditional ceramic cellular filter.
Figure 5:
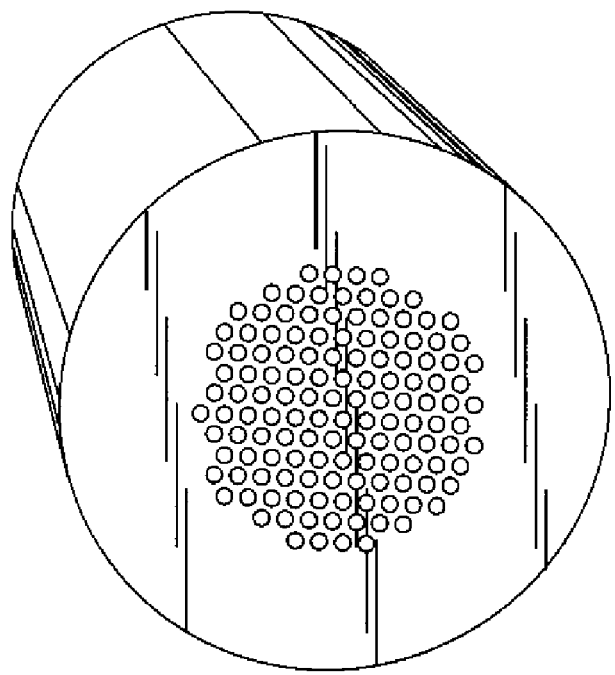
FIG. 5. A drawing of a cellular filter integrated in the bottom of a pouring cup.
Figure 6:
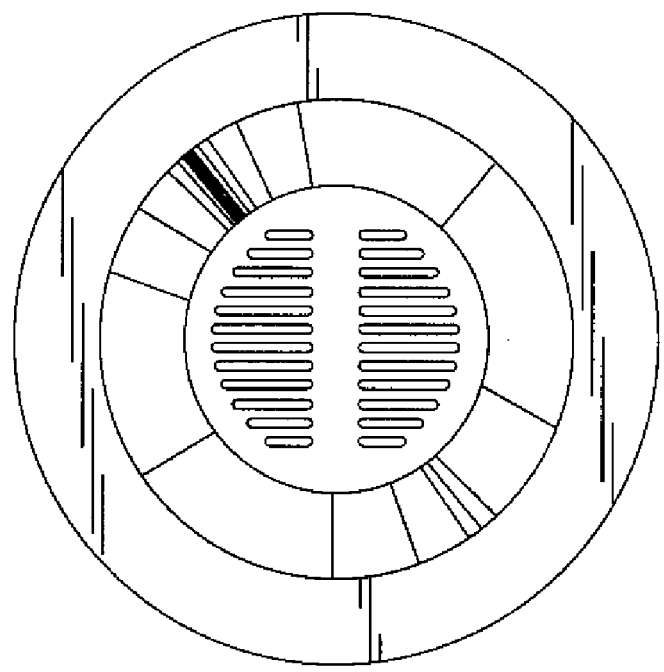
FIG. 6. A drawing of a slotted filter integrated in a pouring cup by machining slots in a solid bottom cup.

Insulating slotted and round hole filters were integrated with a pouring cup. Samples were made by blowing a blend of 100% SG grade microspheres bonded with 10% EXACT-CAST® 101/201 cold box resin. This mix was used to make a filter integrated into a pouring cup. The filter mix was blown into the pouring cup pattern that had been modified with pins on the bottom that would make the filter openings. See FIG. 5. The mix was then gassed with triethylamine in nitrogen at 20 psi according to known methods described in U.S. Pat. No. 3,409,579. Gas time is 0.5 seconds second, followed by purging with air at 20 psi for about 15 seconds. The slotted filter was made by cutting slots in the bottom of a solid bottom cup. See FIG. 6. These designs created a one piece pouring cup with an integrated filter on the bottom of the cup. The holes were distributed across the entire surface of the filter. A traditional pressed ceramic filter was also tested as a basis for comparison. See FIGS. 3 and 4.

Examples 3-4

Preparation of the Insulating Formula for Making Filters

Figure 2:
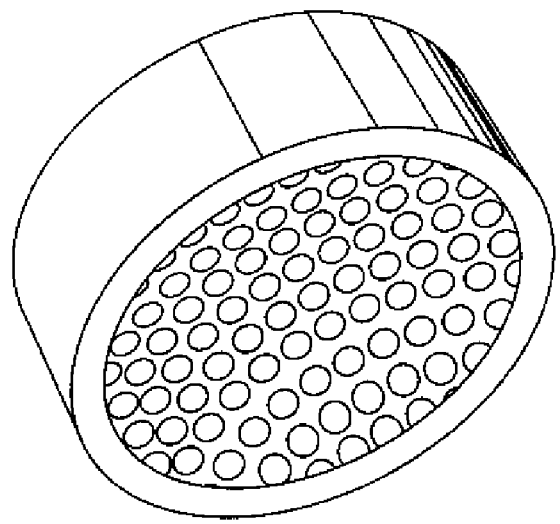
FIG. 2. A drawing of a concave shaped filter exit.

Insulating round hole filters were prepared by drilling and machining the forms from a slab of insulating material. The slab was made by mixing 100% SG grade microspheres with 10% PEP SET® X1000/X2000 no-bake binder sold by Ashland Casting Solutions, a division of Ashland Inc. The resin was used at a at a 55/45 ratio of part I to part II and was catalyzed with 3% PEP SET Catalyst 3501. These samples were subsequently machined into cellular filters that contained a series of round holes and a 2" diameter filtering area with a convex and concave shaped exit surface as shown in FIGS. 1 and 2 respectively.

Molten aluminum metal having a temperature of 760° C. was poured through the traditional pressed ceramic filter and the filters made from microspheres in open air (no downsprue was present) so the stream that exited the filter could be monitored. The test was videotaped and the videotape was reviewed after the test. In the initial test comparing fired ceramic pressed filters to the filter made with the microspheres of the same design, the aluminum exited both filters in individual streams. This can be extremely detrimental to the aluminum casting because it exposes more surface area to oxidation, which can lead to oxide defects in the casting. In production practices the filter is incorporated in a gating system which would eventually coalesce the individual streams back together based on the gating design. However, the faster the streams coalesce, the less exposure the surfaces of the individual streams have to oxidation. If a filter could create the streams to coalesce by the design of the filter working with the surface tension of the metal, this would be the best option.

Figure 7:
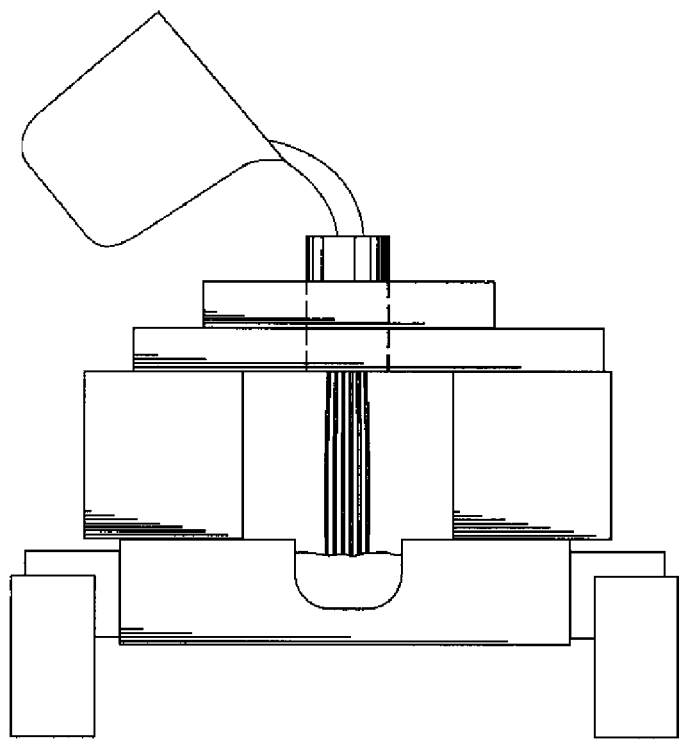
FIG. 7. A drawing of a testing apparatus with a convex exit surface filter showing separating streams.

In an attempt to bring the individual stream exiting the filter back together the exit side of the filter was made into a convex in shape. This resulted in the individual metal streams spreading out and separating even more, which would add to the oxidation of the metal. See FIG. 7.

Figure 8:
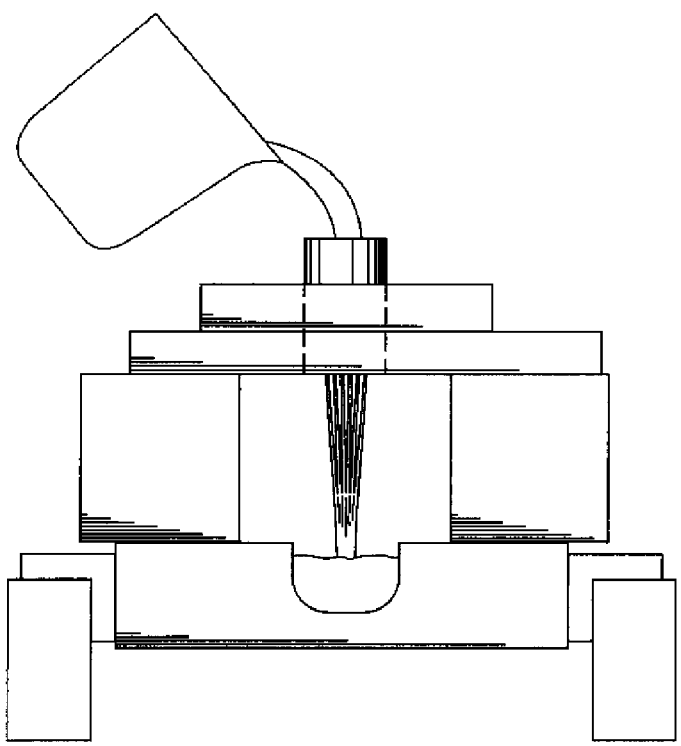
FIG. 8. A drawing of a testing apparatus with a concave exit surface filter showing individual streams being forced back together.

The next test was with a filter whose exit surface was concaved. The results of this test showed a tendency for the streams to come back together and recombine upon exiting the filter. When used as part of a total gating system, this faster means of recombining the metal helps eliminate metal oxides forming at the exit face of the filter. See FIG. 8.

We claim:

1. A process for casting a part from a pour of molten metal into a mold assembly, comprising the steps of:
    inserting, in a flow path of the molten metal into the mold assembly, a foundry shape having openings through which the molten metal flows and having a surface that traps and removes contaminants therefrom, the foundry shape comprising a refractory material that comprises at least 50 weight percent of hollow insulating aluminosilicate microspheres having an average diameter of about 10 microns to 350 microns, based upon the weight of the refractory material, and an effective amount of a foundry binder selected from the group consisting of phenolic resin binders, phenolic urethane binders, furan binders, alkaline phenolic resole binders, epoxy-acrylic binders, and sodium silicate binders;
    filtering the pour through the foundry shape;
    allowing the metal to cool and solidify; and
    separating the cast metal part from the mold assembly.
2. The process of claim 1, wherein:
    the openings in the foundry shape comprise an entrance means and exit means.
3. The process of claim 2 wherein the foundry shape is an integral part of the mold assembly or a pouring cup therefor.
4. The process of claim 2 wherein the exit means is concave.
5. The process of claim 2 wherein the exit means is convex.

* * * * *

UNITED STATES PATENT AND TRADEMARK OFFICE
CERTIFICATE OF CORRECTION

| | | |
|---|---|---|
| PATENT NO. | : 7,967,053 B2 | Page 1 of 1 |
| APPLICATION NO. | : 12/568773 | |
| DATED | : June 28, 2011 | |
| INVENTOR(S) | : Ronald C. Aufderheide et al. | |

It is certified that error appears in the above-identified patent and that said Letters Patent is hereby corrected as shown below:

On the title page, item (74) Attorney, Agent, or Firm please delete "Stanley Law Group LLP" and insert -- Standley Law Group LLP --.

In the Specifications:

In Column 2, line 37, please delete "which it heat" and insert -- which heat --.

In Column 6, line 52, please delete "seconds second" and insert -- seconds --.

In Column 7, line 4, please delete "was used at a at a" and insert -- was used at a --.

Signed and Sealed this
Thirtieth Day of August, 2011

David J. Kappos
*Director of the United States Patent and Trademark Office*